United States Patent
Poje

(10) Patent No.: US 7,832,382 B2
(45) Date of Patent: Nov. 16, 2010

(54) CHEMICAL HEATING DEVICE FOR COLD ENVIRONMENT HEATING UTILITY USE

(76) Inventor: Mark D. Poje, W.310 S.10305 Hywy. I, Mukwonago, WI (US) 53149

( * ) Notice: Subject to any disclaimer, the term of this patent is extended or adjusted under 35 U.S.C. 154(b) by 583 days.

(21) Appl. No.: 11/619,820

(22) Filed: Jan. 4, 2007

(65) Prior Publication Data

US 2007/0151547 A1     Jul. 5, 2007

Related U.S. Application Data

(60) Provisional application No. 60/756,268, filed on Jan. 4, 2006.

(51) Int. Cl.
*F02G 5/00*     (2006.01)

(52) U.S. Cl. .................. 123/557; 219/205; 219/206; 219/207

(58) Field of Classification Search .............. 123/557; 219/528, 212, 386, 205, 206, 207; 47/2, 47/23.3; *F02G 5/00*
See application file for complete search history.

(56) References Cited

U.S. PATENT DOCUMENTS 4,901,472 A * 2/1990 Donohue et al. ............. 47/2
5,981,910 A * 11/1999 Williams et al. ............ 219/386
6,380,523 B1 * 4/2002 Jones, Sr. .................... 219/528

* cited by examiner

*Primary Examiner*—Michael Cuff
*Assistant Examiner*—Keith Coleman
(74) *Attorney, Agent, or Firm*—Joseph S. Heino; Patrick M. Bergin

(57) ABSTRACT

A strap-like support includes means for removably affixing chemical heating elements to one side of the support and means for removably securing the ends of the support whereby the support can be removably attached to the fuel filter of a diesel engine. Alternatively, the strap-like support component is configured to wrap around a fuel line, fuel pipe, or other conduit. Alternatively, the heating device is devised of a sheet-like support component having means for removably affixing one or more chemical heating elements to one side of the support component and means for removably securing the edges of the support component to a surface whereby the component can be removably attached to the oil pan or fuel tank of an engine or with a self-contained, individual meal product of conventional manufacture. The heating device is temporarily attached to the meal product container to heat the food contents.

4 Claims, 4 Drawing Sheets

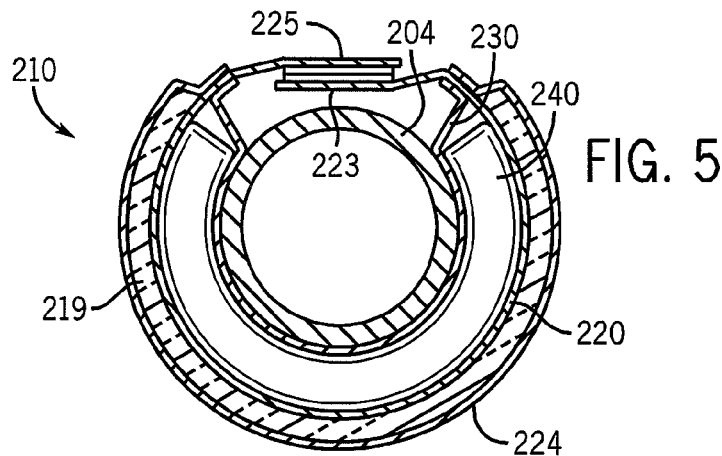
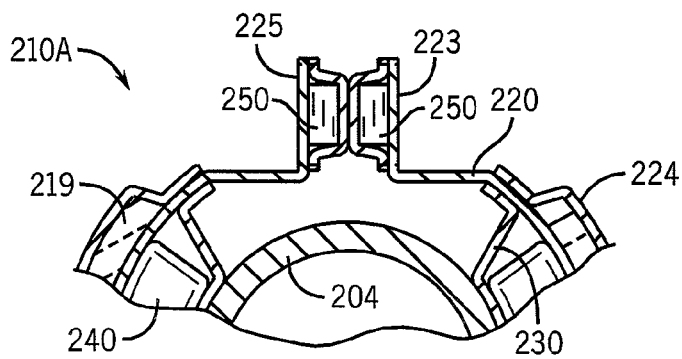
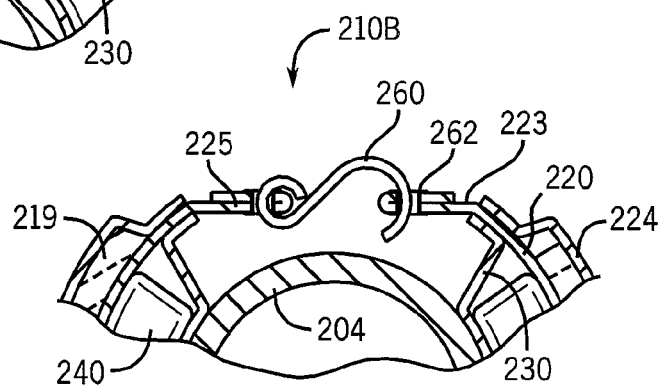
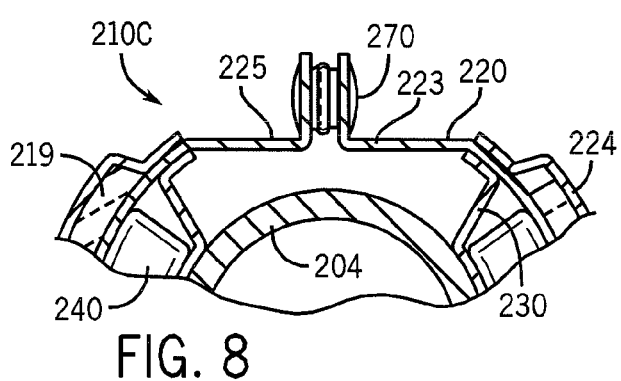

CHEMICAL HEATING DEVICE FOR COLD ENVIRONMENT HEATING UTILITY USE

This application claims the benefit and priority of U.S. Provisional Patent Application Ser. No. 60/756,268 filed Jan. 4, 2006.

FIELD OF THE INVENTION

This invention relates generally to portable heating devices. More particularly, it relates to a reusable chemical heating device that uses one or more chemical heating elements that are attachable to a support member whereby the heating elements can be used for warming the components of mechanical equipment when such equipment is used in cold environments and when the support member is secured to the component of the mechanical equipment and the chemical heating elements are activated. It also relates to a reusable chemical heating device that uses at least one chemical heating element and that is attachable to ready-to-eat meal product containers.

BACKGROUND OF THE INVENTION

Power loss of mechanical equipment during winter or cold weather conditions is a common occurrence. Absent a component failure within the engine of the equipment, the problem can frequently be traced back to the effects of winter weather and cold environment on the fuel that is used to run the engine or on the fluids that are used to lubricate the engine. In the case of diesel engines, the problem is frequently found to be the formation of gel within the diesel fuel that restricts fuel flow through the fuel filter thus making diesel engines particularly difficult to start in cold weather.

For example, DF-2 diesel fuel begins to thicken as the ambient temperatures drop toward the freezing point of 32° Fahrenheit (F.), or 0° Celsius (C.). This thickening generally begins to be evident at about 40° F. or 4° C., but can vary between different fuels. The reason for this thickening is that many fuels, such as DF-2, contain waxes or paraffins that congeal at lower temperatures. As the fuel thickens, it also begins to "cloud." This "clouding" is the direct result of the solidifying of the wax or paraffin that is present in the fuel.

The "cloud point" refers to the temperature at which diesel fuel begins to thicken and cloud. As the temperature continues to drop below the freezing point, the wax molecules combine to become solids in the fuel and eventually become large enough to be captured within the filtration media contained within the fuel filter. This is commonly known as the "gel point" or the "pour point" which refers to the temperature at which the fuel thickens further and will no longer pour. Some engines will fail to run at the cloud point, but all diesel engines will fail at the pour point. Usually, the cloud point and the pour point are about 20° F., or 10° C., apart, with the pour point being well below the cloud point at about 20° F. or about −7° C. At this low temperature, the wax will begin to form a flow-restrictive coating on the filter media which results in a loss of engine power. The fuel filter media becomes almost instantly coated with a restrictive layer of wax. Usually enough fuel can pass this layer to allow the engine to idle, but not enough fuel will pass to allow the engine to attain desired operating RPMs.

One way of overcoming the temporary problem of fuel filter freeze-up, and to thaw gelled fuel in the filter, is to open the fuel filter canister and add a commercially-available additive directly to the fuel filter. While this solves the problem, this solution also requires that the fuel filter be replaced. Accordingly, this solution is time-consuming, labor-intensive and relatively costly since it requires the user to purchase a supply of additive and to purchase a new fuel filter each time the additive is used.

Another way of overcoming the temporary problem of fuel filter freeze-up is to apply a direct, but improvised, heat source to the fuel filter and to the lines leading to and from the filter. For example, a small amount of fuel or other combustible contained within a wicked container can be placed in the vicinity of the fuel filter canister. Though effective, this is an obviously dangerous method of thawing the fuel filter and restoring the flow of fuel through the filter. An alternative to this suggestion is the equally-hazardous and oft-made suggestion that the trucker simply carry a propane torch for use in thawing frozen fuel lines and fuel filters during cold weather conditions.

Another application where thawing and/or heating is required is in the area of food products. For example, cans and other packages containing ready-to eat food products typically require removal of the food product from the can or packaging such that the food product can be heated. Other self-contained, individual meals that are provided in lightweight packaging for use in combat or other field conditions where organized food facilities are not available are more palatable if heated first prior to eating.

In the view of this inventor, what is needed is a substantially safer device that can be used to apply heat directly to the fuel filter of a diesel engine, as well as to other parts of machinery. What is also such a heating device that can be used without the need for the user to tap into any type of electrical connection or other secondary power source. That is, there is a need for the heating device to be both self-contained and self-heat-generating. What is also needed is such a heating device that utilizes and incorporates currently-available chemical heating technology as the heat source for the device. What is also needed is such a heating device that can be easily and removably applied to the fuel filter and to its inlet and outlet lines. What is also needed is such a heating device that can be used and re-used as desired or required. What is also needed are a number of variations of such a heating device that can also be attached to other components of mechanical equipment including oil pans, hydraulic fluid lines, and other like components.

What is also needed is such a heating device that can be adapted for use with cans and other packages containing ready-to eat food products. What is also needed is such a heating device that eliminates the need to remove the food product from the can or packaging for purposes of heating the food product. It would also be desirable to provide such a heating devise that can be adapted for heating other self-contained, individual meals that are provided in lightweight packaging for use by the military during combat conditions, by adventurous outdoor enthusiasts during hikes, camp-outs and the like, or in other civilian field conditions such as in disaster relief areas where organized food facilities are not available. Under any of those situations, the ready-to-eat meal is simply more palatable if heated first prior to eating.

SUMMARY OF THE INVENTION

It is, therefore, a principal object of this invention to provide a new, useful, and uncomplicated device that can be used to safely apply heat directly to the fuel filter of a diesel engine. It is another object to provide such a heating device that can be used without the need for any type of electrical connection or other secondary power sources to supply the heat source for the device. It is still another object of the present invention to provide such a device that can be self-contained and that is self-heat-generating by utilizing and incorporating currently-available chemical heating technology as the heat source for the device. It is yet another object of the present invention to provide such a heating device that can be easily and removably applied to the fuel filter and to its inlet and outlet lines. It is still another object of the present invention to provide such a heating device that can be used and re-used as desired or required. It is still another object of the present invention to provide for a number of alternative embodiments and variations of such a heating device that can also be attached to other components of mechanical equipment including oil pans, hydraulic fluid lines, and other like engine components. It is still another object to provide such a heating device that can be adapted for the heating of canned or packaged food products, or for the heating of self-contained, individual meals in conventional packaging.

The present invention has obtained these objects. In a first preferred embodiment, it provides for a strap-like support component having means for removably affixing chemical heating elements to one side of the support component and means for removably securing the ends of the support component to one another whereby the support component can be removably attached to the fuel filter of a diesel engine. In another preferred embodiment, the strap-like support component is configured to wrap around a fuel line, fuel pipe, or other conduit. In still another preferred embodiment, the heating device is devised of a sheet-like support component having means for removably affixing one or more chemical heating elements to one side of the support component and means for removably securing the edges of the support component to a surface whereby the component can be removably attached to the oil pan or fuel tank of an engine.

Various alternative embodiments and configurations for the attachment means of the chemical heating device of the present invention are also contemplated by this inventor and are disclosed herein. One alternative embodiment that is significant is the use of a heating device that is used with a self-contained, individual meal product of conventional manufacture. The heating device is temporarily attached to the meal product container to heat the food contents as desired or required.

The foregoing and other features of the chemical heating device for cold environment heating utility use and for the heating of self-contained, individual meals that is constructed in accordance with this invention will be apparent from the detailed description that follows.

BRIEF DESCRIPTION OF THE DRAWINGS

FIG. 5 is a right side elevational and cross-sectioned view of the chemical heating device illustrated in FIG. 4, taken along line 5-5 of FIG. 4, and showing the device as it would be wrapped around a cylindrical object, such as a pipe.

FIG. 6 is an enlarged partial right side elevational and cross-sectioned view of the chemical heating device illustrated in FIGS. 4 and 5 and showing a first alternative attachment means for securing the device to the pipe-like object.

FIG. 7 is an enlarged partial right side elevational and cross-sectioned view of the chemical heating device illustrated in FIGS. 4 and 5 and showing a second alternative attachment means for securing the device to the pipe-like object.

FIG. 8 is an enlarged partial right side elevational and cross-sectioned view of the chemical heating device illustrated in FIGS. 4 and 5 and showing a third alternative attachment means for securing the device to the pipe-like object.

DETAILED DESCRIPTION

Figure 1:
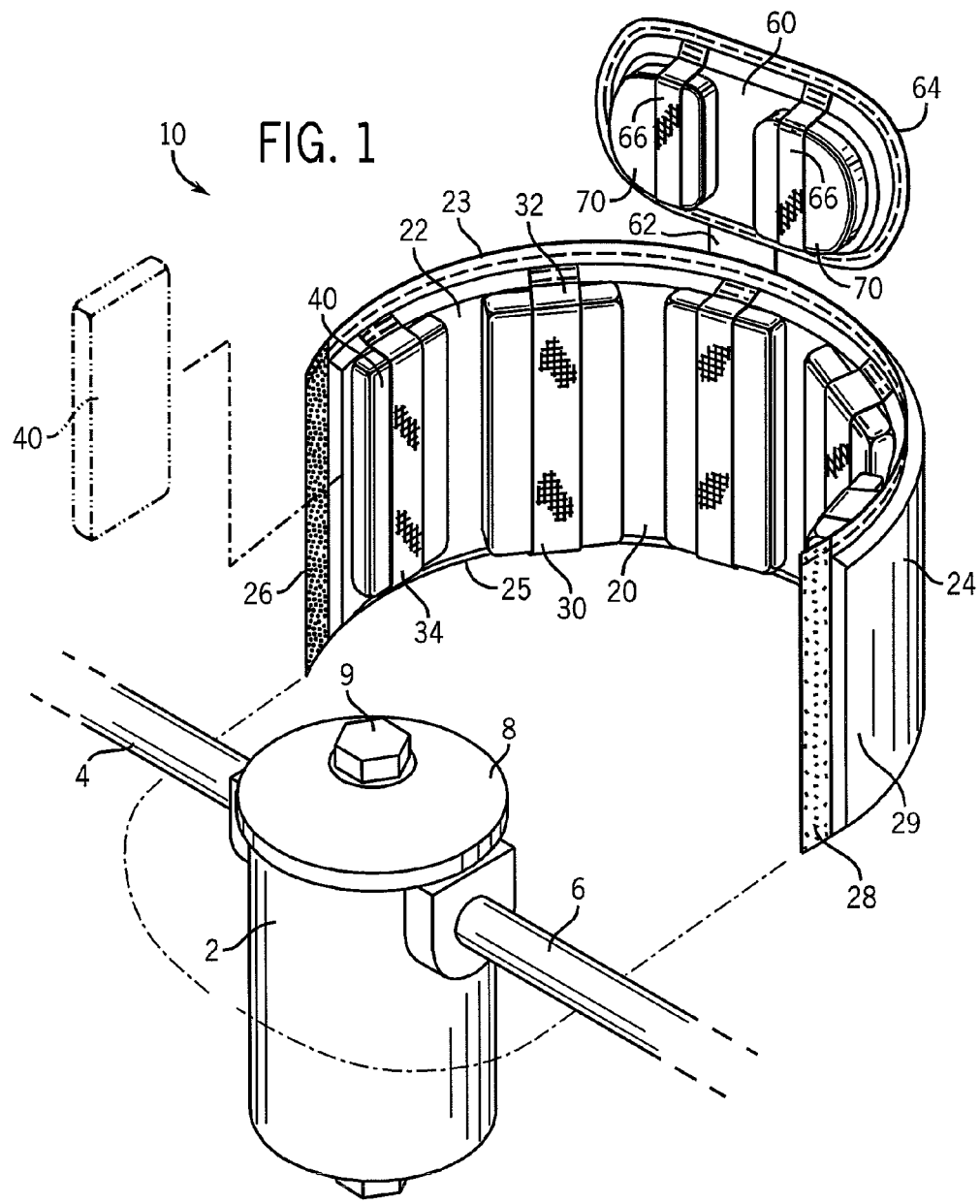
FIG. 1 is a top, front and right side perspective view of a first preferred embodiment of a chemical heating device that is constructed in accordance with the present invention and showing how the device would be used with the fuel filter of a diesel engine.

Referring now to the drawings in detail, wherein like numbered elements refer to like elements throughout, FIG. 1 illustrates a first preferred embodiment of a chemical heating device, generally identified 10, which is constructed in accordance with the present invention. As referred to earlier, freezing temperatures frequently cause diesel fuel to become cloudy due to tiny wax molecules falling out of solution. Once diesel fuel has reached this "cloud point," the wax molecules can quickly clog the filter media of a fuel filter, which leads to fuel starvation and eventual shutting down of the engine. The chemical heating device 10 of the present invention is particularly well-suited to deal with and overcome this type of problem.

As shown, the first embodiment of the chemical heating device 10 of the present invention is constructed of a flat and wide belt-like or strap-like support member 20 having a front face 22 and a back face 24, the front face 22 being intended to be adjacent to and face towards the object to be heated and the back face 24 being intended to face away from the object. The chemical heating device 10 further includes a first end 26 and a second end 28. The front face 22 of the support member 20 includes a plurality of attachment means in the form of strap-like retainers 30 that are attached at one end 32 to one edge 23 of the support member 20 and at a second end 34 to a second edge 25 of the support member 20. The retainers 30 may be made of a stretch fabric that allows the length of the retainer 30 to be stretched such that a heating element 40 can be placed beneath the retainer 30. It should be noted that the attachment means is not a limitation of the present invention and that other means could be used to secure the heating elements 40 within the support member 20. The advantage of using strap-like retainers 30 as shown is that more surface area of the heating element 40 is available for exposure to the object being heated, as compared to a pocket, for example. But such is not a limitation to the chemical heating device 10 of the present invention.

It is also to be understood that the heating elements disclosed in this application, including the heating elements 40 used with the first preferred embodiment of the present invention are not limited to any one type or to any one shape or size. Preferably, the heating elements are of the type that are chemically actuated by exposure to air. The heating elements may also be of the type that are re-usable or re-chargeable, but need not be limited to that type of heating element.

Referring again to FIG. 1, it will be seen that the chemical heating device 10 of the first preferred embodiment is configured to be wrapped about the fuel filter housing or canister 2 of a diesel engine (not shown). The canister 2 has a diesel fuel filter (also not shown) disposed within it, the filter being of the type previously described herein and being susceptible to flow restriction during cold weather congealing of the diesel fuel. The fuel filter canister 2 also includes a fuel inlet line 4 and a fuel outlet line 6. Although the chemical heating device 10 illustrated in FIG. 1 is not intended to be applied directly to the fuel lines 4, 6, another embodiment of the present invention is intended to be used in this fashion as will become apparent later in this detailed description.

The chemical heating device 10 also includes a secondary support member 60, the secondary support member 60 being attached to the second edge 25 of the support member 20 by means of an attaching strap 62. The secondary support member 60 has a perimeter edge 64 that is generally circular in shape and is configured to overlay the top portion 8 of the fuel filter canister 2. In order to accommodate the head 9 of a retention bolt that is used to hold the top portion 8 of the fuel filer canister 2 to the canister 2, the secondary support member 60 includes a pair of straps 66 that extend between two points of the edge 64, one strap 66 being located to either side of the bolt head 9. Again, this configuration allows secondary heating elements 70 to be held by the straps 66 and in close proximity to the outer surfaces of the canister 2, and particularly the top portion 8 thereof. Here again, the precise means of attaching the secondary support member 60 to the support member 20 is not a limitation of the present invention. Nor is the precise configuration for attaching the secondary heating elements 80 to it.

It should be noted also that, in the first preferred embodiment of the chemical heating device 10 disclosed, the rear face 24 of the support member 20 includes an insulated layer 29. This insulated layer 29 is provided to insure that most of the heat generated by the heating elements 40 is directed towards and absorbed by the object to be heated which, in this case, is the diesel fuel filter canister 2. The secondary support member 60 is similarly insulated. The media for this insulating layer 29 can be of any type that is intended for heat reflection away from the layer 29, the precise type not being a limitation of the present invention.

It should also be noted that the first end 26 and the second end 28 of the support member 20 include attachment means, or means for attaching the two ends 26, 28 to one another. This attachment means is disclosed as a Velcro® looped material but could be configured in other ways as will become apparent later in this detailed description.

Figure 2:
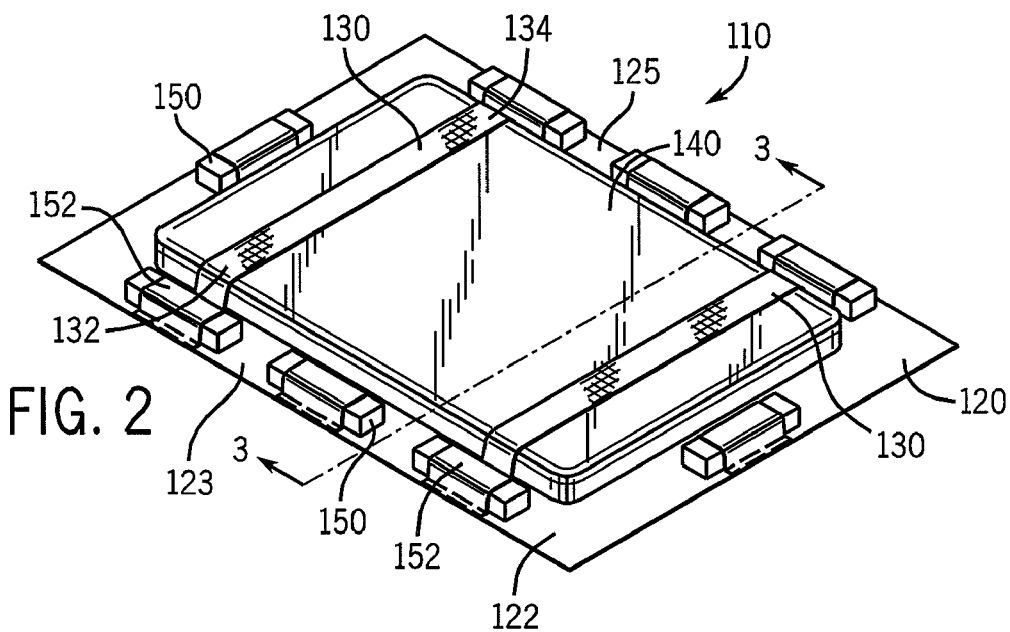
FIG. 2 is a top, front and right side perspective view of a second preferred embodiment of a chemical heating device that is constructed in accordance with the present invention.
Figure 3:
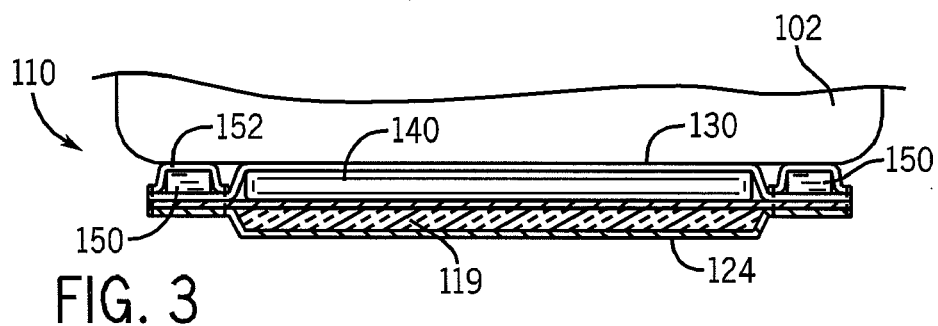
FIG. 3 is a right side elevational and cross-sectioned view of the chemical heating device shown in FIG. 2 and taken along line 3-3 of FIG. 2.

Referring now to FIGS. 2 and 3, a second preferred embodiment of the chemical heating device, generally identified 110, is shown. This embodiment of heating device 110 comprises a rectangular-shaped and sheet-like support member 120 having a front face 122 and a rear face 124. The front face 122 includes a plurality of securing means in the form of strap-like retainers 130 that are attached at one end 132 to one edge 123 of the support member 120 and at a second end 134 to a second edge 125 of the support member 120. The retainers 130 may be made of a stretch fabric that allows the length of the retainer 130 to be stretched such that a single heating element 140 can be placed beneath the retainers 130. Alternatively, a plurality of heating elements 140 could also be used. It should also be noted here that the attachment means is not a limitation of the present invention and that other means could be used to secure the heating element 140 within the support member 120 as well. Again, the advantage of using strap-like retainers 130 as shown is that more surface area of the heating element 140 is available for exposure to the object being heated, as compared to a pocket, for example. But such is not a limitation to the chemical heating device 110 of the present invention.

Referring again to FIG. 2, it will be seen that the heating device 110 of the second preferred embodiment is configured to be secured to a metal surface, such as the oil pan 102 of a piece of equipment or machinery (not shown). This is accomplished by the use of a number of magnets 150 that are secured within retainers 152 that are disposed at the edges 123, 125, 127, 129 of the support member 120. The magnets 150 effectively suspend the heating element 140 immediately below the pan 102 such that, when the support member 120 is magnetically attached to the oil pan 102 as is shown in FIG. 3, the heat from the heating element 140 will radiate into the pan 102 and its contents (also not shown). To facilitate this heating process, the rear face 124 of the support member 120 includes an insulated layer 119, the insulating layer 119 being filled with a suitable material having insulating properties.

Referring now to FIGS. 4 through 8, they illustrate yet a third alternative preferred embodiment of a chemical heating device, generally identified 210, constructed in accordance with the present invention. This chemical heating device 210 is similar to the first two embodiments in that it comprises a support member 220 having a front face 222 and a rear face 224. The device 210 is, however, different in that its length can be variable. That is, the device 210 can comprise a number of segments or sections 212, the number of sections 212 used being determined by the user's specific application. This particular embodiment of chemical heating device 210 is well suited for being applied to the fuel lines 4, 6 illustrated, for example, to either side of the fuel filter canister 2 shown in FIG. 1.

Figure 4:
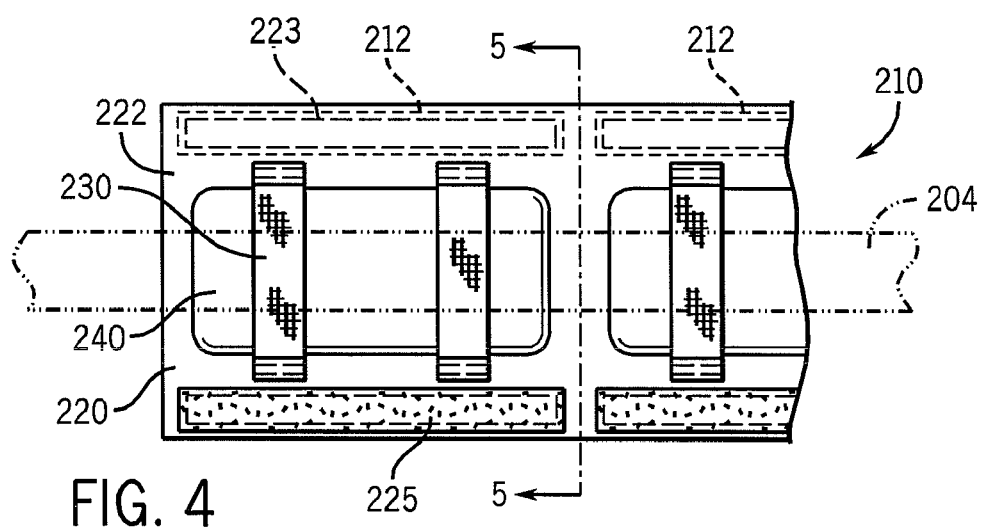
FIG. 4 is a top plan view of a third preferred embodiment of a chemical heating device that is constructed in accordance with the present invention.

Referring again to FIG. 4, it will be seen that the front face 222 of each section 212 of the support member 220 includes a plurality of attachment means in the form of strap-like retainers 230. The retainers 230 are attached transversely across the support member 220 and secured at one edge 223 of the support member 220 and at a second edge 225 of the support member 220. The retainers 230 may be made of a stretch fabric that allows the length of the retainer 230 to be slightly stretched such that a heating element 240 can be placed longitudinally along the support member 220 and beneath the retainers 230. As with the other embodiments, it should be noted here that the attachment means is not a limitation of the present invention and that other means could be used to secure the heating element 240 within the support member 220. The advantage of using strap-like retainers 230 as shown is that more surface area of the heating element 240 is available for exposure to the object being heated, as compared to a pocket, for example. But such is not a limitation to the chemical heating device 210 of the present invention. As shown in FIG. 4, it is also possible for like segments 212 to be connected together longitudinally to provide a given length to the device 210. Again, the number of segments 212 is not a limitation of the present invention.

This third preferred embodiment, as shown in FIG. 5, can be wrapped around a pipe or line 4, 6, such as those shown in FIG. 1. Obviously, the chemical heating device 210 of this embodiment can be wrapped around any similar tubular object to apply heat to it. To facilitate this heating process as applied to the tube 204 shown in FIG. 5, the rear face 224 of this support member 220 also includes an insulated layer 219, the insulating layer 219 being filled with a suitable material having insulating properties.

To secure the chemical heating device 210 to the tube 205, it should also be noted that the first edge 223 and the second edge 225 of the support member 220 include attachment means, or means for attaching the two edges 223, 225 to one another. See FIG. 5. This attachment means is disclosed as a Velcro® looped material but could be configured in other ways.

For example, the attachment means in an alternative attachment embodiment of the chemical heating device 210A could include magnets 250 applied to the edges 223, 225, as shown in FIG. 6. In another alternative attachment embodiment of the heating device 210B, the attachment means could include a hook 260 and loop 262 configuration as shown in FIG. 7. In still another alternative attachment embodiment of the heating device 210C, the attachment means could include other snap-fit fasteners 270 of the type generally shown in FIG. 8. It is to be understood that these various attachment means could also be applied to the other previously-described strap-like and sheet-like embodiments of the present invention, to the extent that functionality of the chemical heating devices 10, 110, 210 is not compromised. It is also possible that other attachment means could be used such as a basic tie strap configuration (not shown) where the user simply ties the ends of the straps together, the straps encircling the chemical heating devices 10, 110, 210 and the object to which the heating devices 10, 110, 210 are attached when used as intended. Elastomeric tethers and straps may also be used in a similar fashion.

While the first embodiment of the present invention, as illustrated in FIG. 1 could be used to heat the contents of a conventional metal can containing a food product, it is recognized that food product packaging can take other forms. For example, other sealable containers may be more pouch-like in appearance. Many food products are packaged in pouches, such pouches having advantages over the conventional metal can including being light-weight, flexible and even flat. One example of modern food product containers that are self-contained individual meal rations that are used by the military (known as the "MRE" or "meals-ready-to-eat"), by backpackers and campers, and by organizations that assist with disaster relief throughout the world. Since it is desirable that such meals be heated, as most persons would prefer, some meals of this type are heated using a flameless heater that requires the addition of water to activate. To heat the meal, the user must insert the heater and the meal pouch into a box that the pouch came in. This method is cumbersome and does not allow for the re-use of the heating device.

Figure 9:
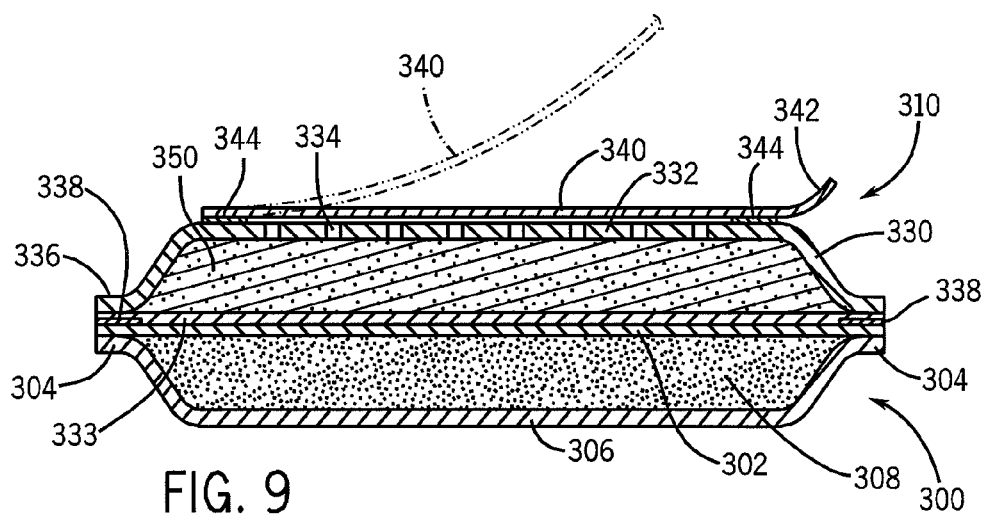
FIG. 9 is a side elevational and cross-sectioned view of a heating device of the present invention shown attached to the packaging of a self-contained, individual meal.
Figure 10:
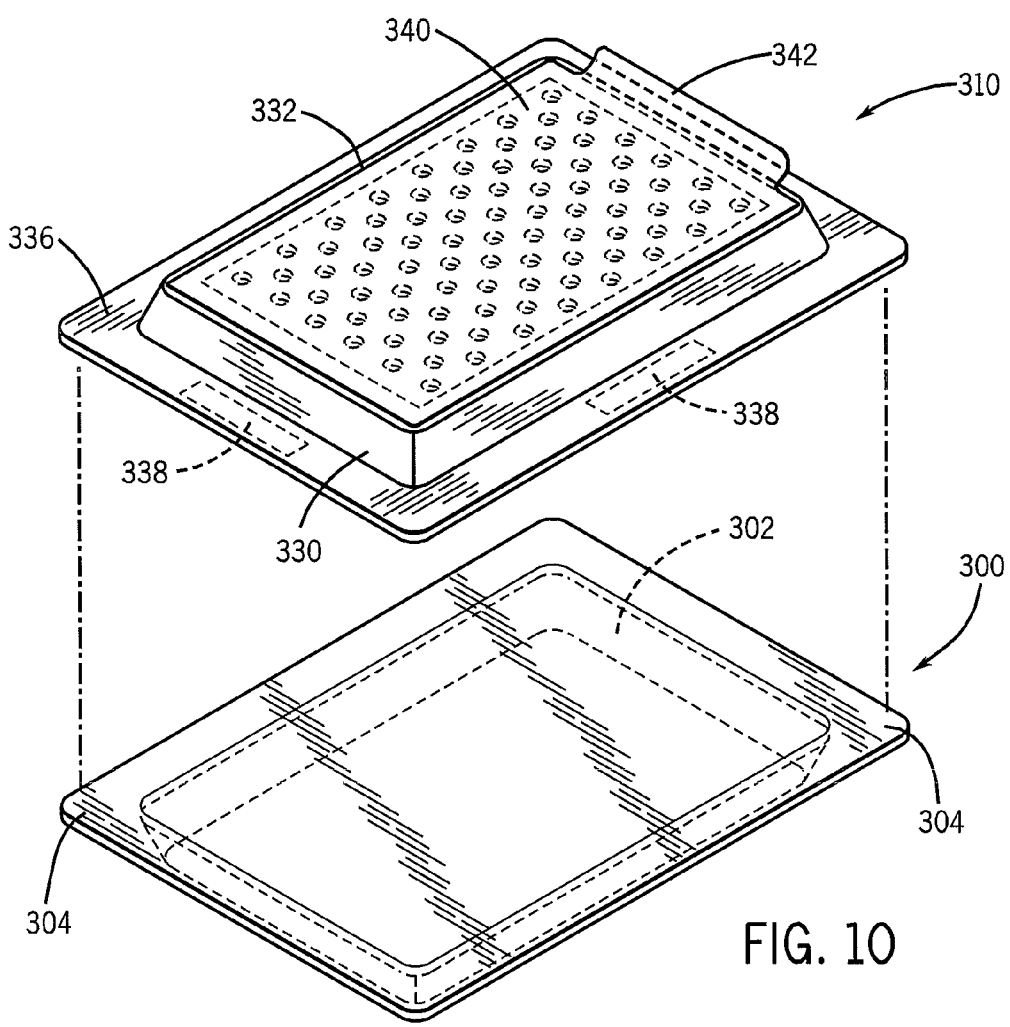
FIG. 10 is a front, side and top exploded perspective view illustrating the heating device and packaging shown in FIG. 9 prior to attachment of the heating device to the meal packaging.

Referring now to FIGS. 9 and 10, a fourth preferred embodiment of the chemical heating device, generally identified 310, is shown. This embodiment of heating device 310 comprises a rectangular-shaped, shallow upside-down, pan-like structure 330 having a top portion 332 and a bottom portion 333. The top portion 332 and the bottom portion 333 are sealed at a peripheral edge 336. Sealingly contained within the heating device 310 is the air-actuated, heat-generating media 350. During use, air is able to access the heat-generating media 350 by means of a plurality of apertures 334 that are defined within the top portion 332 of the heating device 310. When not in use, the apertures 334 are covered by a film-like cover 340. The cover 340 includes a tab 342 for grasping the cover 340. See FIG. 10, in particular. The cover 340 adheres to the top portion 332 of the heating device 310 by means of an adhesive layer 344. See FIG. 9. In this fashion, the cover 340 can be peeled back to activate the heat-generating media 350. Once the heating process has completed, the heat-generating media 350 can be preserved for further later use by re-adhering the cover 340 to the top portion 332 of the heating device 310.

The self-contained, individual meal package 300 includes a flat top surface 302, although the meal package 300 could be more pouch-like in its actual construction. As shown, however, the package 300 also includes a bottom pan-like structure 308. The food product 308 is sealed between the top surface 302 and the pan-like structure 306 about a peripheral edge 304. The peripheral edge 336 of the heating device 310 of the present invention includes an adhesive 338 that allows the heating device 310 to be releasably attached to the top surface 302 of the meal container 300. To activate the heat-generating media 350 of the heating device 310, the user peels back the cover 340 to allow air-activation of the media 350. When the food product 308 is heated, the cover 340 may be put down atop the top portion 332 of the heating device 310 and the heating device 310 removed from the meal container 300. The heating device 310 can then be re-used until such time at the media 350 contained within it requires re-charging. It should also be noted here that the attachment means is not a limitation of the present invention and that other means could be used to secure the heating device 310 to the meal container 300 and such is not a limitation to the chemical heating device 310 of the present invention.

In view of the foregoing, it will be seen that there have been provided in this disclosure several embodiments of a new, useful, non-obvious and uncomplicated chemical heating device that can be used to safely apply heat directly to the fuel filter of a diesel engine; that can be used without the need for any type of electrical connection or other secondary power sources to supply the heat source for the device; that can be self-contained and is self-heat-generating by utilizing and incorporating currently-available chemical heating technology as the heat source for the device; that can be easily and removably applied to the fuel filter and to its inlet and outlet lines as well as any number of other equipment components; that can be used and re-used as desired or required; that can be adapted for use with cans and other packages containing ready-to eat food products; that eliminates the need to remove the food product from the can or packaging for purposes of heating the food product; that can be adapted for heating other self-contained, individual meals that are provided in light-weight packaging for use by the military during combat conditions, by adventurous outdoor recreationists during camp-outs and the like, or in other civilian field conditions such as in disaster relief areas where organized food facilities are not available; and that can be configured in a number of alternative embodiments and variations that allow the device to be attached to a wide variety of other components of mechanical equipment including oil pans, hydraulic fluid lines, other like engine components, particularly in cold use environments, and food and meal packaging. The embodiments described in this application are not exhaustive but recited for purposes of explanation and enablement to one skilled in the art.

In accordance with the foregoing, I claim as my invention the following:

1. A flexible chemical heating device configured to be wrapped about the fuel filter housing or canister of a diesel engine comprising a flexible support member having a front face, a first end and a second end, a plurality of chemical heating elements, means for temporarily securing the plurality of chemical heating elements within the front face of the support member, and means for attaching together the first end and the second end of the support member such that the front face of the support member and plurality of chemical heating elements are adjacent to and wrapped about a fuel filter canister of a diesel engine to apply heat to the fuel filter canister of the diesel engine.

2. The chemical heating device of claim 1 wherein the means for temporarily securing a plurality of chemical heating elements within the front face of the support member comprises a support member having a first edge and a second edge and further comprises a plurality of retainers, each retainer being a strap-like member having a first end and a second end, and each retainer being attached at its first end to the first edge of the support member and at its second end to the second edge of the support member.

3. The chemical heating device of claim 2 wherein each strap-like retainer is made of a stretch fabric that allows the length of the retainer to be stretched such that a heating element can be placed beneath it.

4. A flexible chemical heating device comprising:

a plurality of chemical heating elements, a flexible support member having a first end, a second end, a first edge and a second edge, the flexible support member further comprising a plurality of retainers, each retainer being a resiliently stretchable strap-like member having a first end and a second end, and each retainer being attached at its first end to the first edge of the support member and at its second end to the second edge of the support member, a secondary support member, the secondary support member being flexibly attached to the primary support member; and a fastener for attaching the first end of the support member to the second end of the support member such that the front face of the support member and plurality of chemical heating elements are adjacent to and wrapped about the periphery of a fuel filter canister and the secondary support member is operable to cover the top of the fuel filter canister to apply heat to the fuel filter canister.

* * * * *